United States Patent
Markeson

(10) Patent No.: US 6,871,412 B2
(45) Date of Patent: Mar. 29, 2005

(54) ALIGNMENT TOOL AND METHOD FOR ALIGNING LARGE MACHINERY

(76) Inventor: Daniel Markeson, 7324 NE. 288th St., Kingston, WA (US) 98346

( * ) Notice: Subject to any disclaimer, the term of this patent is extended or adjusted under 35 U.S.C. 154(b) by 0 days.

(21) Appl. No.: 10/128,852

(22) Filed: Apr. 23, 2002

(65) Prior Publication Data

US 2003/0196342 A1 Oct. 23, 2003

(51) Int. Cl.[7] .................. B23Q 16/00; F16M 11/18
(52) U.S. Cl. .................. 33/358; 33/1 M; 254/89 R
(58) Field of Search .................. 33/568, 569, 573, 33/333, 1 M; 254/89 R, 95; 280/6.15; 384/107, 45, 49

(56) References Cited

U.S. PATENT DOCUMENTS

| | | | | |
|---|---|---|---|---|
| 824,525 A | * | 6/1906 | Bonney | 33/333 |
| 2,655,223 A | * | 10/1953 | Villars | 254/89 R |
| 3,566,804 A | * | 3/1971 | Mietla | 254/95 |
| 4,706,936 A | * | 11/1987 | Riedl | 254/89 R |
| 4,729,669 A | * | 3/1988 | Walter et al. | 384/45 |
| 5,090,664 A | | 2/1992 | McCullouh et al. | |
| 5,106,207 A | * | 4/1992 | Fry | 384/49 |
| 5,156,238 A | * | 10/1992 | Matthews | 254/89 R |
| 5,518,220 A | * | 5/1996 | Bertrand et al. | 254/89 R |
| 5,680,731 A | * | 10/1997 | Guy | 254/89 R |
| 5,727,656 A | * | 3/1998 | Gaudioso et al. | 254/89 R |
| 6,193,219 B1 | * | 2/2001 | Belley et al. | 254/89 R |
| 6,260,428 B1 | * | 7/2001 | Clement | 33/568 |
| 6,422,536 B1 | * | 7/2002 | Kelley et al. | 254/89 R |
| 6,483,215 B1 | * | 11/2002 | Bodmer et al. | 384/107 |

* cited by examiner

Primary Examiner—R. Alexander Smith
(74) Attorney, Agent, or Firm—Jensen & Puntigam PS

(57) ABSTRACT

Apparatus and method for the alignment of large machinery, including a tool for supporting each corner of the machine during alignment. The tool during the alignment operation is substantially frictionless and is capable of limited, controlled movement to accomplish the alignment within small fractions of an inch, both vertically and horizontally. The alignment is accomplished by placing a tool in position, elevating the machine until it is totally supported by a plurality of tools and accomplishing the alignment guided by a precision measuring instrument.

5 Claims, 4 Drawing Sheets

US 6,871,412 B2

ALIGNMENT TOOL AND METHOD FOR ALIGNING LARGE MACHINERY

TECHNICAL FIELD

This invention relates to defining the appropriate alignment of main engines, gear cases, large shafts, as well as generators to turbines, and more particularly to the apparatus and method for doing these alignments quickly and accurately. The feet of the machine to be aligned are jacked to a position to where they clear of the supporting floor and are in fact supported by a temporarily stable, but basically frictionless pad and then through controlled movement guided by a laser, dial indication or any precision measuring instrument, moved to the correct alignment, stabilized and returned to the supporting floor.

BACKGROUND OF THE INVENTION

Historically, generators, which can easily weigh up to 850 tons supported by up to 20–30 feet have been aligned with their counterparts vertically through the use of jacks and shims and horizontally through the use of large steel beams, which lay under the generator across the concrete foundation, having uprights welded to each end. These vertical beams allow the placement of a jack to exert a horizontal push while sliding the entire weight of the machine on the 20–30 feet. Pushing a 38'×15'850 ton box while sliding against the resistance of the 20–30 feet tends to place bending stress on the device. Further, it is difficult to stop the move at 0.002 inches once you have established enough hydraulic pressure to overcome the friction of the system. A perfectly aligned machine sits level of even distribution with weight across all of its feet. A lack of even distribution results in torqued machine leading to a wide variety of premature problems. A perfectly aligned machine is also perfect at the coupling and some of the installations have a requirement of less than 0.001 inch per vertical and horizontal offset across the coupling. This requires placing a 250 to 850 ton machine in a spot with tolerances less than ⅓ the thickness of a human hair.

One known prior art attempt at solving this problem is found in U.S. Pat. No. 5,090,664, in the name of McCullough et al, dated Feb. 25, 1992, which discloses a combination jack and roller for movement of heavy loads. The structure relies on opposing wedges for vertical movement and a plurality of roller bearings for limited horizontal movement

SUMMARY OF THE INVENTION

With the above-noted prior art and problems in mind, it is an object of the present invention to provide a tool for temporarily supporting a large machine and then, with controlled movement on a basically frictionless pad, align it with and couple it to a mating shaft.

It is another object of provide a method of quickly and easily aligning coupled machines.

It is a further object of the present invention to provide a tool of sufficient strength to lift and support large machinery while providing a substantially frictionless support during controlled movement.

Yet another object of the present invention is to provide a means and method for quickly and accurately aligning adjacent machinery.

A further object of the present invention is to provide a method for accurately locating large machinery that may be computer controlled.

BEST MODE FOR CARRYING OUT THE INVENTION

Figure 1:
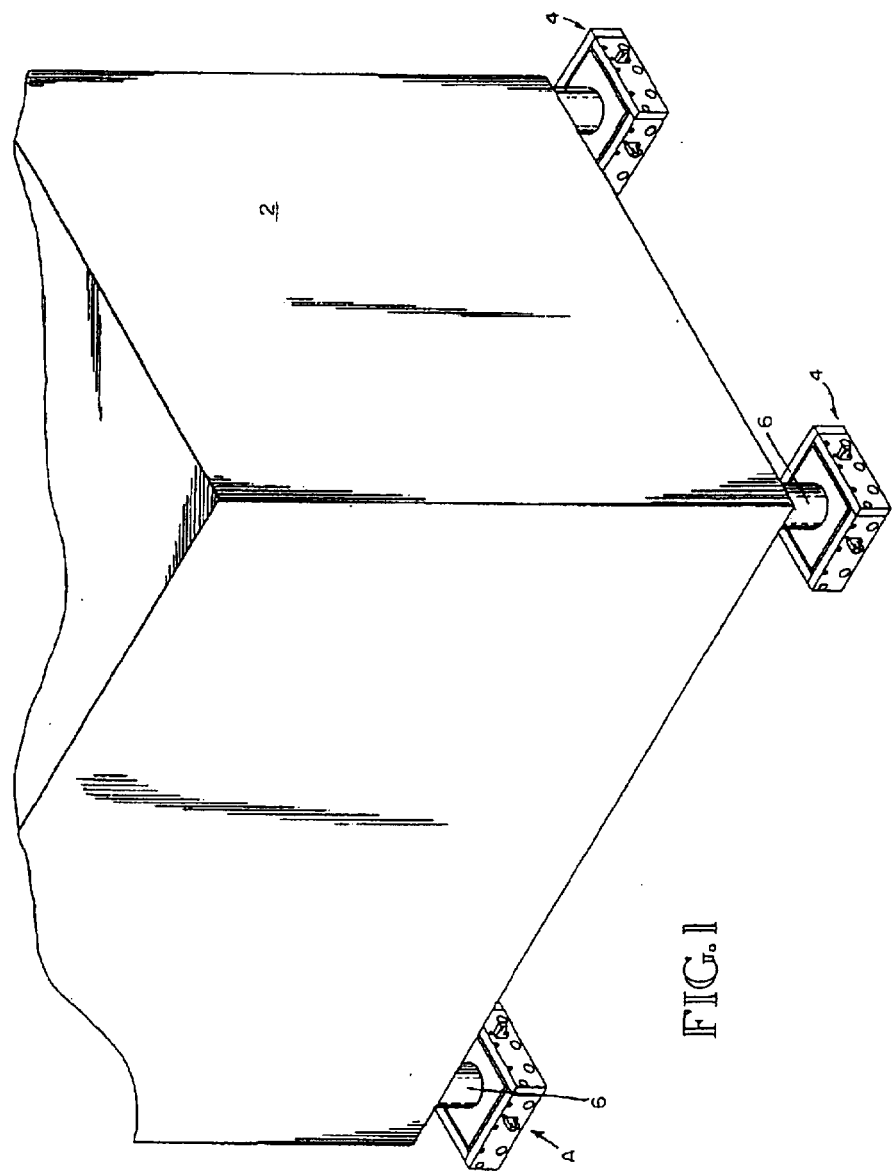
FIG. 1 is an environmental view showing the inventive structure in place beneath the four corners of a rectangular block, representing a large piece of machinery.

As seen in FIG. 1, the rectangular block 2 is representative of a large piece of machinery such as a generator engine or turbine, which because of its very nature, requires that it be carefully aligned with adjacent machinery, such that the interconnecting shafts or the like operate in a "true" fashion. Temporarily secured to each corner of the block 2 is the aligning tool, explained in detail hereinafter, which supports a jack 6 which is used in the method of aligning the devices utilizing a laser alignment device, dial indication or other precision alignment device (not shown).

Figure 2:
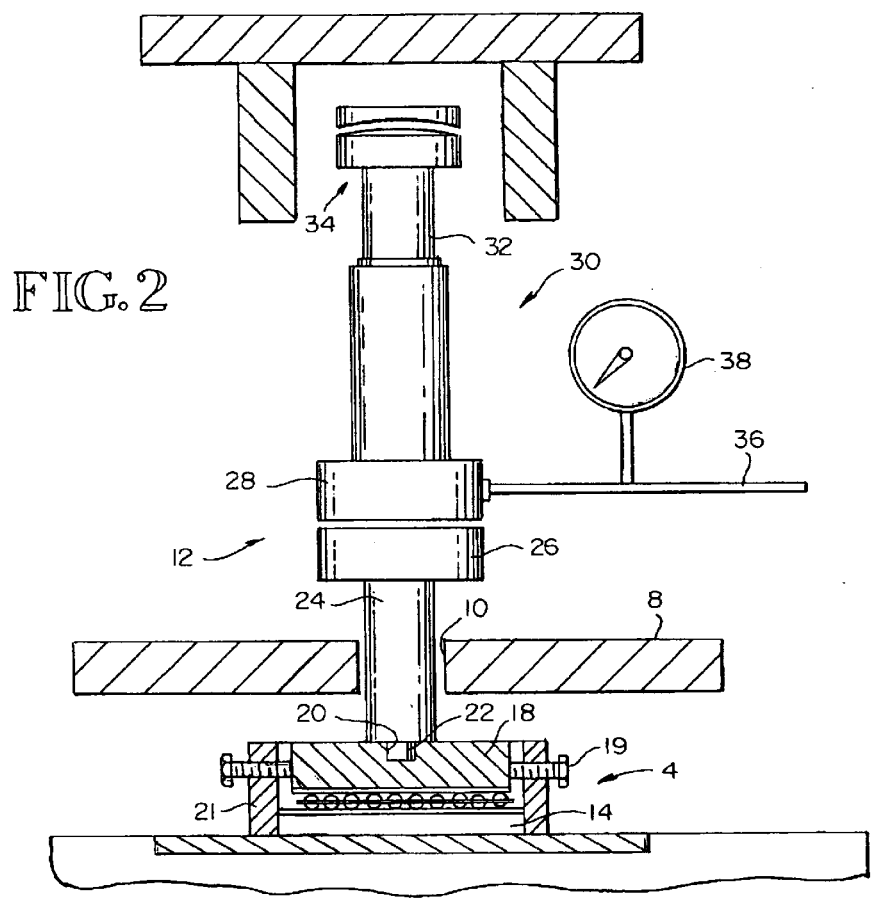
FIG. 2 is a vertical view partially in section displaying the inventive concept configured as in use.

As seen in FIG. 2, portions of the generator frame 8 are shown, including an opening 10 in the lower frame permitting insertion of the leg of a support pedestal 12 as explained hereinafter. As noted hereinabove, the generator rests on feet and in order to quickly and accurately align the generator, it must be lifted off of the feet and the weight of the generator supported on a frictionless surface or on a tool providing a frictionless surface.

In order to accomplish the above, the alignment tool 4 which comprises a base plate 14 supporting a layer of captured steel balls 16 which supports a top plate 18 capable of restricted movement is placed upon a steel plate 20 imbedded in the concrete foundation 22. Side plates 21 surround bottom plate 14, defining a vertical wall, and limit the extent of movement of top plate 18 to its interior horizontal dimension when in use and serves as a foundation for jacking bolts 19, which serve to secure top plate 18 during setup and movement during operation, as well as other control or monitoring devices. Top plate 18 includes a cylindrical bore 20 which receives the downwardly extending locator pin 22 of a downwardly extending leg 24 of pedestal 12 which also includes a landing pad 26. Resting on the top of the landing pad 26 is the base 28 of an appropriately sized hydraulic jack 30 having a telescopically received cylinder 32 topped with a convex/concave angle eliminator 34. Secured to the hydraulic jack is a source of hydraulic fluid under pressure as at line 36 and which includes a pressure gauge 38 to monitor the operation.

As should be obvious, the system is modular and each set includes means for attaching the device to the machine to be moved, whether this be a sideways attachment or simply a placement of the hydraulic cylinder beneath the framework in addition to the lifting tool and the applicable shimming material to achieve the necessary position. Generators less than or equal to a thousand megawatts will require one full set or unit per corner. Generators larger than one thousand megawatts will require two sets or units per corner. The lifting tool itself is to be located between a hydraulic lifting cylinder and a deck or other supporting structure and will be capable of supporting as much as 200 tons and allow for precision movement of the cylinder in any direction. The tool has to be rigid enough to be located on an imperfect floor or other support surface and be able to move its load accurately with very little resistance. The tool also allows for accurate measurement of these moves through the use of dial indicators. One of the challenges in developing the tool has been to insure that a small surface could withstand a great load. The tool's subplate is two inches thick and made of cold rolled steel. The bearing plates are 1.5 inches thick and cut from A-2 Die Steel, which is then hardened to approximately 63 rockwell. Between the bearing plates is a field of 400 ½ inch ball bearings, which have a crush rating of 17,600 pounds each. The high number of balls is intended to reduce the weight per ball and minimize rolling friction.

Both the subplate and the bottom bearing plate in the tool are 13 inches×13 inches. The jacking plate (the top bearing plate) is 12 inches×12 inches and the ball field is also 12 inches×12 inches. When the jacking plate is centered, there is ½ inch margin available for movement in each direction. The walls of the move are drilled and tapped for assembly for jacking bolts and for application of dial indicators. There would be one tapped hole on each side allowing a jacking bolt to stabilize the ball field during installation. In addition, there will be three tapped holes on each side at the level of the jacking top bearing plate for control of this plate when loaded. There is a clean hole on each side of the jacking plate to allow the insertion of a dial indicator and finally there is a bracket to mount the dial indicators.

Two jack bolts, normal to each other at each corner, are used during the critical adjustment in order to maintain control.

Historically, the only means of adjusting the generator vertically has been using vertical jacking bolts threaded through the base plate. The jacking bolts make contact with the foundation and force the generator foot in a vertical direction when turned lifting the generator. This was obviously very time-consuming, utilizing up to eight hours to lift the unit and then to twelve hours to set and then back down.

The other means to move the generator in a vertical direction was to attach trunnions to the generator sidewalls, build a foundation under the trunnion and install a solid jack and press from the foundation to the trunnion. In the case of some generators, lifting angles will be attached to the foot ribs and used in combination with a lifting beam, a hydraulic cylinder and one of the inventive tools. Necessary plates and shims are placed on the deck beneath the lifting angles to achieve a reasonable level surface to place the tool upon. The bearing field and jacking plate will be centered in the tool prior to installation and secured in the center position with jacking bolts. The jacking bolts will keep the moving parts secured during the generator lift and remain secured until it is necessary to move the generator in any direction. With the tool in position, the cylinder is placed upon it, and finally, the main lifting beam atop the cylinder.

The hydraulic system is configured to allow for lifting of two corners at a time (two or four cylinders depending on the size of the generator). It will be necessary to have lift either on one end or one side at a time and it is never permissible to lift opposite corners at one time or one corner at a time because this results in a twist on the machine. Once the lift has been achieved and prior to any work on, around or under the feet, the locking nuts on the cylinders will be engaged, the hydraulics bled off to insure positive mechanic and control of the vertical position. In the event a shim change is necessary, the tool will have to be removed to allow access to the shims. In this case, after the unit has been raised, the jacking bolts and the feet will be run down to assume the load or hydraulic cylinders will be depressurized and removed along with the main lifting beam and the tool.

Figure 3:
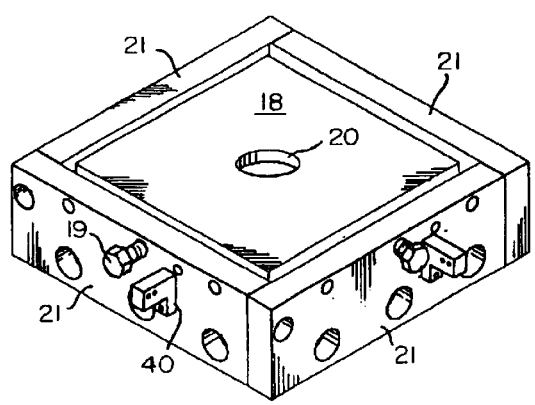
FIG. 3 is an isometric view of the inventive tool for moving large pieces of machinery.

Referring now to FIG. 3, the tool 4 as seen in the enlarged and isometric view, it can be more readily seen that the top plate 18 is centered between side plates 21 allowing for the necessary movement for the alignment. Also seen in this view is the center bore 20, the threaded bores to receive the jack bolts 19 and gauge supporting brackets 40.

Figure 4:
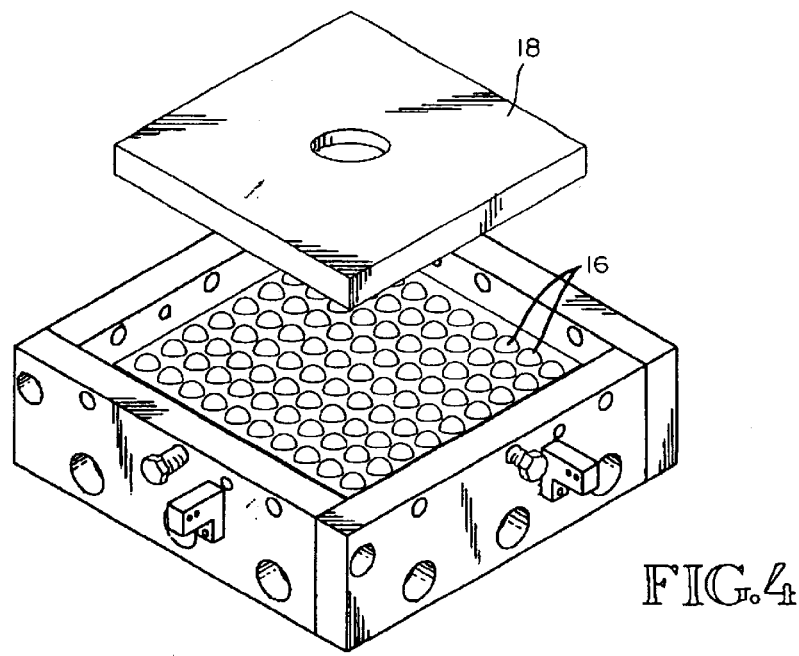
FIG. 4 is a perspective view of the tool of FIG. 4 with the top plate exploded showing supporting ball bearings.

FIG. 4 depicts the tool as shown in FIG. 2 including the captured ball bearings 16.

Figure 5:
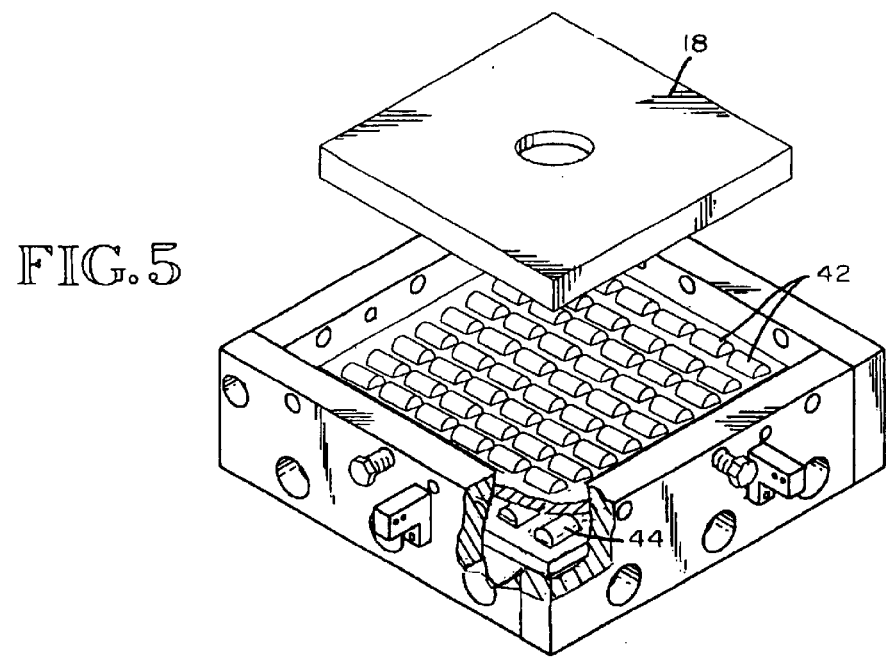
FIG. 5 is a view similar to FIG. 4 partially in section using two layers of roller bearings.

FIG. 5 shows another embodiment of the present invention wherein the infinite frictionless movement is allowed by means of a pair of sheets of roller bearings, wherein the bearings are normal to each other wherein the layers are depicted as 42 and 44.

Figure 6:
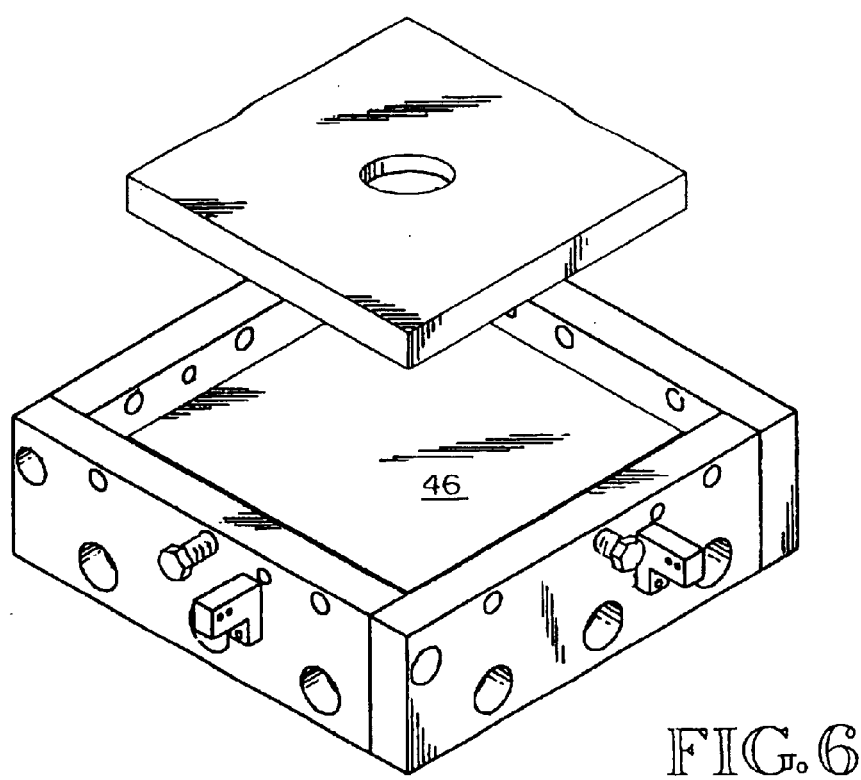
FIG. 6 is a view similar to FIG. 4 wherein the friction reducing media is grease under pressure.

FIG. 6 depicts yet another embodiment wherein the frictionless utility is provided by a layer of grease 46 under pressure.

Thus it can be seen that the inventive tool allows the placement and alignment of large pieces of machinery efficiently, effectively and safely. The machine is supported upon rigid stable means and any movement is controlled. Although the preferred embodiment relies on manual control, it is contemplated that computer or other conventional control may well be implemented.

What is claimed is:

1. A tool fox accomplishing minute alignment adjustments for very large machinery comprising:
    a bottom plate for contact with a supporting surface;
    a vertical wall secured to and extending upwardly along the entire edge of the bottom plate forming an upwardly open container;
    a low friction intermediate element within the vertical wall;
    a top plate adjacent the low friction intermediate element, at least partially within said vertical wall, said top plate of a dimension less than the interior horizontal dimension of the vertical wall; and
    means to move the top plate relative to the bottom plate, whereby when the top plate supports a piece of machinery the moving means allows Controlled minute multidimensional substantially uniplanar horizontal adjustments to assure alignment with adjacent machinery.

2. A tool as in claim 1, wherein the low friction intermediate element comprises a plurality of captured ball bearings.

3. A tool as in claim 1, wherein the low friction intermediate element comprises two layers of roller bearings at right angles and separated by a plate.

4. A tool as in claim 1, wherein the low friction intermediate element comprises a layer of captured fluid.

5. A method of moving heavy machinery over small distances for alignment purposes, comprising the steps of:
    elevating each corner of the machine with a jack, wherein each corner is supported by a temporarily secured, floating bed, wherein the floating bed is surrounded by a vertical wall and has a bottom plate, a low friction intermediate element and a top plate, and said vertical wall including means to restrict movement of the top plate;
    releasing the bed for controlled multidimensional substantially uniplanar horizontal movement;
    accurately positioning the machine through movement of the top plate; and
    releasing the jacks.

* * * * *